July 11, 1950  E. BRICHARD  2,515,076
TOOL CONTROLLING DEVICE FOR GLASS CUTTING MACHINES
Filed Dec. 20, 1945  2 Sheets-Sheet 1

INVENTOR
EDGARD BRICHARD
By: Haseltine, Lake & Co.
AGENTS

July 11, 1950 E. BRICHARD 2,515,076
TOOL CONTROLLING DEVICE FOR GLASS CUTTING MACHINES
Filed Dec. 20, 1945 2 Sheets-Sheet 2

INVENTOR
EDGARD BRICHARD
By:
Haseltine, Lake & Co.
AGENTS

Patented July 11, 1950

2,515,076

UNITED STATES PATENT OFFICE 2,515,076

TOOL CONTROLLING DEVICE FOR GLASS CUTTING MACHINES

Edgard Brichard, Jumet, Belgium, assignor to Union des Verreries Mecaniques Belges, S. A., Charleroi, Belgium, a Belgian company Application December 20, 1945, Serial No. 636,103
In Belgium February 28, 1945

4 Claims. (Cl. 33—32)

1

The tools for cutting or treating glass usually should only gradually come into contact with the surface of the glass articles in order to avoid breaking or damaging the tool or the article treated.

When the tool is moved parallel to the surface of the glass, its downward speed can be controlled by means of an inclined ramp on which a member connected to the tool is caused to glide owing to the relative movement of the tool and the glass, whereby the coming into contact with the glass is slowed down. This arrangement however has the drawback of requiring the position of the ramp to be adjusted to suit each article and each operation to be performed on said article.

The object of the present invention is to moderate automatically the downward movement of the tool, whatever be the size and the position of the article and whatever be the point where the downward movement of the tool takes place. To this end, in accordance with my invention, a rotatable cam is interposed between the tool and the glass article or a surface moved in synchronism with said article, said cam being loosely mounted on its axis so that as soon as it comes into contact with the glass or other surface, it rolls thereon until the tool contacts with the glass. The downward speed of the tool thus is determined by the shape of the cam.

In the accompanying drawings I have shown by way of example two devices in accordance with my invention, which are adapted to control the drawing of a cutting line by means of a diamond on a sheet of glass.

Figure 1:
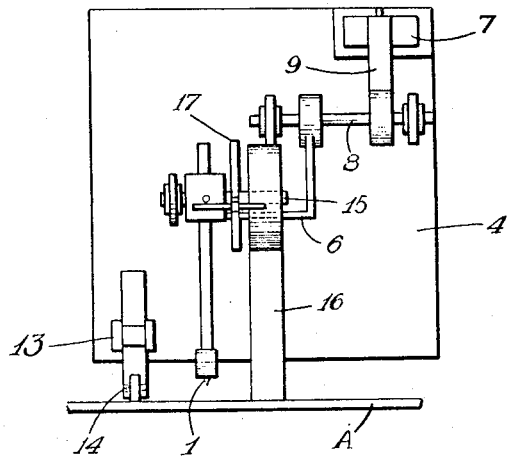
Figs. 1, 2 and 3 show one form of device in front view, side elevation and plan view respectively.

The cutting tool 1 is secured to a lever 2 pivoted at 3 to a support or bracket 4 which is moved parallel to the glass sheet A. Under the action of gravity or/and of a spring 5 the tool 1 tends to bear on the glass with sufficient force to make a scratch therein. It is adapted to be lifted from the surface of the glass by a crank rod 6 controlled by any suitable means, for example electrically by means of an electro-magnet 7. To that end the crank rod 6 which is pivoted at 8 to the bracket 4 is rigidly connected with an arm 9 carrying the armature 10 of the electro-magnet 7.

The energising of the electro-magnet 7 is controlled for example by means of a switch comprising a contact finger 11 pivoted at 12 to a lever 13 secured to the bracket 4. At the end of the finger 11 is mounted a roller 14 which is urged by gravity

2 to take a position in the path of the glass sheet, the switch then being closed; thus the opening and the closing of the circuit comprising the electro-magnet coil are controlled respectively by the leading edge and by the trailing edge of the glass sheet passing under the roller 14.

Figure 2:
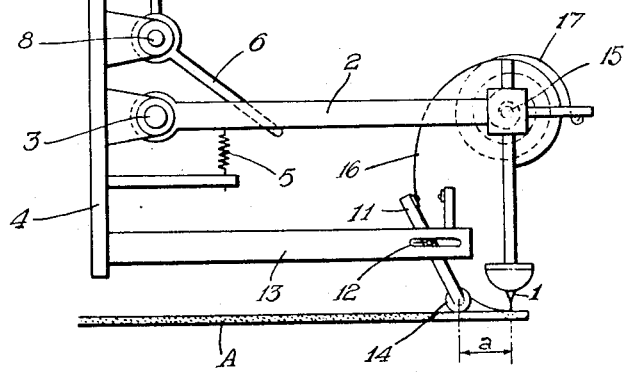

On the tool carrying lever 2 is fastened a pin 15 on which a rotatable cam 16 is loosely mounted. This cam has an outline with a gradually decreasing radius starting from a maximum radius and its size is preferably such that it slightly touches the glass without resting thereon when the tool is in raised position. It normally takes up this position by the action of gravity, or of a spring 17, its maximum radius then being at right angles to the surface of the glass at the contact point as shown in Fig. 2.

Under these conditions, when the tool 1 is freed, it is prevented from heavily dropping onto the glass sheet by the cam which supports it and transmits its weight to the glass sheet.

As the glass sheet moves, its frictional engagement with the cam causes the latter to roll on the glass, gradually allowing the tool to move down at a rate determined by the outline of the cam. This outline is so chosen that the tool comes to rest on the glass without any shock. As soon as the tool rests on the glass, the cam is freed from any load and then glides on the glass.

The size of the cam in the example shown is such that its linear operative stroke is greater than the distance a between the roller 14 and the tool 1. Thus the tool 1 comes into contact with the glass after the leading edge of the glass has passed thereunder and it is lifted before the passing of the trailing edge, these two operations being controlled by the same switch operated successively by each of said edges.

Figure 4:
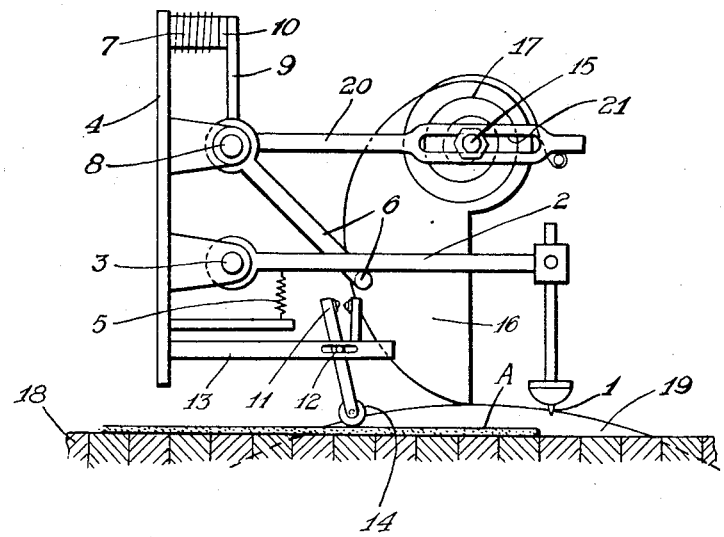
Figs. 4 and 5 show another form in side elevation and plan view respectively.
Figure 5:
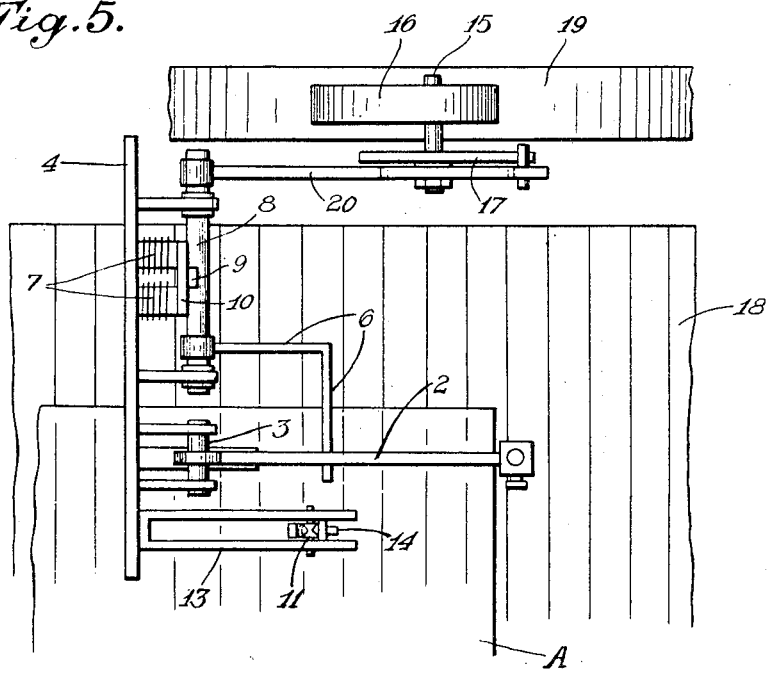

The operation of course remains the same if, instead of coming to rest on the glass sheet itself, the cam comes to rest on the support 18 on which said sheet is placed, or on any other surface moving in synchronism with the glass sheet, i. e. simultaneously with and at the same speed as or at a speed proportional to the speed of the glass sheet. An example of such an arrangement is illustrated in Figs. 4 and 5 of the drawings in which the cam 16 is shown resting on the periphery of a pulley 19 moving in synchronism with the support of the glass sheet.

Figure 3:
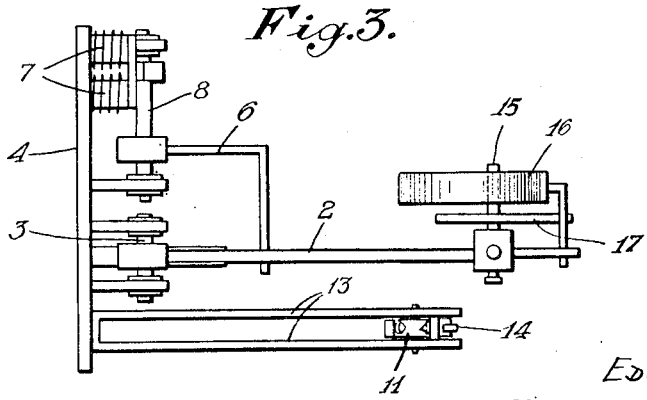

Instead of being mounted in line with the tool 1, as shown in Figs. 1 to 3, the cam 16 may be supported at any other point on the lever 2, or on another lever which may be mounted on shaft 3 or on shaft 8. This latter arrangement is shown in Figs. 4 and 5, where the pin 15 on which the cam 16 is rotatably mounted, is carried by a lever 20 mounted on the shaft 8 and is rigid with said shaft, arm 9 and rod 6.

In the various cases considered, it is possible to vary the speed of the downward movement of the tool either by moving the pin 15 along its carrying lever, as in a slot 21 in said lever, or by moving the tool, or the point of engagement of the crank 6 with the lever 2, or again by replacing the cam by another cam of different outline.

It will be understood that in any of these cases, in addition to its moderating action on the downward speed of the tool, the cam delays and carries back the contact of the cutting tool with the glass.

On the other hand the cam does not in any way interfere with the lifting of the tool, as it then merely reverts to its initial position under the action of gravity or/and of the spring 17. The upward movement therefore may be as quick as desired.

The operation of course is the same whatever be the number of tools mounted on the shaft 3, the cam then simultaneously controlling the downward movement of all the tools.

It is also immaterial whether the glass sheet or article moves with respect to the tool or tools, or vice-versa. Furthermore, the use and operation of the cam are not in any way limited to the electric tool control herein shown by way of example, as any other suitable tool controlling means may be used in carrying out my invention.

I claim:

1. A device for controlling the operation of glass cutting tools, comprising in combination a support, a lever pivotally mounted on said support, said lever being normally urged towards the glass to be cut, a cutter tool on said lever, means for temporarily raising said lever, a surface moving in synchronism with the glass to be cut, and a freely rotatable cam of gradually decreasing radius in frictional engagement with said surface, said cam being operatively connected with said lever.

2. A device for controlling the operation of glass cutting tools comprising in combination a support, a lever pivotally mounted on said support, said lever being normally urged towards the glass to be cut, a cutter tool on said lever, electrically controlled means for temporarily raising said lever, a member controlled by the glass to be cut for putting said electrically controlled means into and out of action, a surface moving in synchronism with the glass to be cut, and a freely rotatable cam of gradually increasing radius in frictional engagement with said surface, said cam being operatively connected with said lever.

3. In a device for controlling the operation of glass cutting tools, the combination of a lever, means normally urging said lever toward the glass to be cut, a cutter tool on said lever, a rotatable cam of gradually decreasing radius operatively connected with said lever, a supporting surface for said cam movable with the glass, and means for mounting said cam in rolling relation with said surface with gradually decreasing radii until the tool engages the glass, thereby providing gradual contact of said tool with the glass.

4. A device for controlling the operation of glass cutting tools, comprising in combination a support, a lever pivotally mounted on said support, means normally urging said lever toward the glass to be cut, a cutter tool on said lever, means for temporarily raising said lever, a surface moving in synchronism with the glass to be cut, and a freely rotatable cam having a gradually decreasing radius and operatively connected with said lever to carry the same when said raising means is out of action, said cam being frictionally engageable with said surface for rolling contact therewith, said gradually decreasing radius providing gradual contact of said tool with the glass.

EDGARD BRICHARD.

REFERENCES CITED

The following references are of record in the file of this patent:

UNITED STATES PATENTS

| Number | Name | Date |
|---|---|---|
| 1,834,143 | Callard et al. | Dec. 1, 1931 |
| 2,184,126 | Philippe | Dec. 19, 1939 |